United States Patent
Singman-Aste et al.

(10) Patent No.: US 7,249,125 B1
(45) Date of Patent: Jul. 24, 2007

(54) SYSTEM AND METHOD FOR AUTOMATICALLY DETERMINING MODAL VALUE OF NON-NUMERIC DATA

(75) Inventors: Michael K. Singman-Aste, Alameda, CA (US); Seán Thrower, Warlingham (GB)

(73) Assignee: Computer Associates Think, Inc., Islandia, NY (US)

( * ) Notice: Subject to any disclaimer, the term of this patent is extended or adjusted under 35 U.S.C. 154(b) by 564 days.

(21) Appl. No.: 10/682,214

(22) Filed: Oct. 9, 2003

(51) Int. Cl.
 G06F 17/30 (2006.01)
 G06F 9/44 (2006.01)
(52) U.S. Cl. .................. 707/3; 707/104.1; 715/503
(58) Field of Classification Search ............... None
 See application file for complete search history.

(56) References Cited

U.S. PATENT DOCUMENTS

| 5,280,547 A * | 1/1994 | Mahoney ............... 382/302 |
| 5,752,052 A | 5/1998 | Richardson et al. ........ 704/9 |
| 5,963,894 A | 10/1999 | Richardson et al. ........ 704/9 |
| 6,564,202 B1 | 5/2003 | Schuetze et al. ........... 707/2 |
| 6,598,054 B2 | 7/2003 | Schuetze et al. ....... 707/103 R |
| 2002/0049570 A1 * | 4/2002 | Grace et al. ............. 702/194 |

* cited by examiner

*Primary Examiner*—Jeffrey Gaffin
*Assistant Examiner*—Hassan "Tony" Mahmoudi
(74) *Attorney, Agent, or Firm*—Pillsbury Winthrop Shaw Pittman, LLP

(57) ABSTRACT

A method for automatically determining at least one modal value of non-numeric data includes selecting a data subset of a dataset, the data subset comprising at least a portion of the dataset and including at least one non-numeric value. At least one modal value is determined based on the selected data subset.

19 Claims, 4 Drawing Sheets

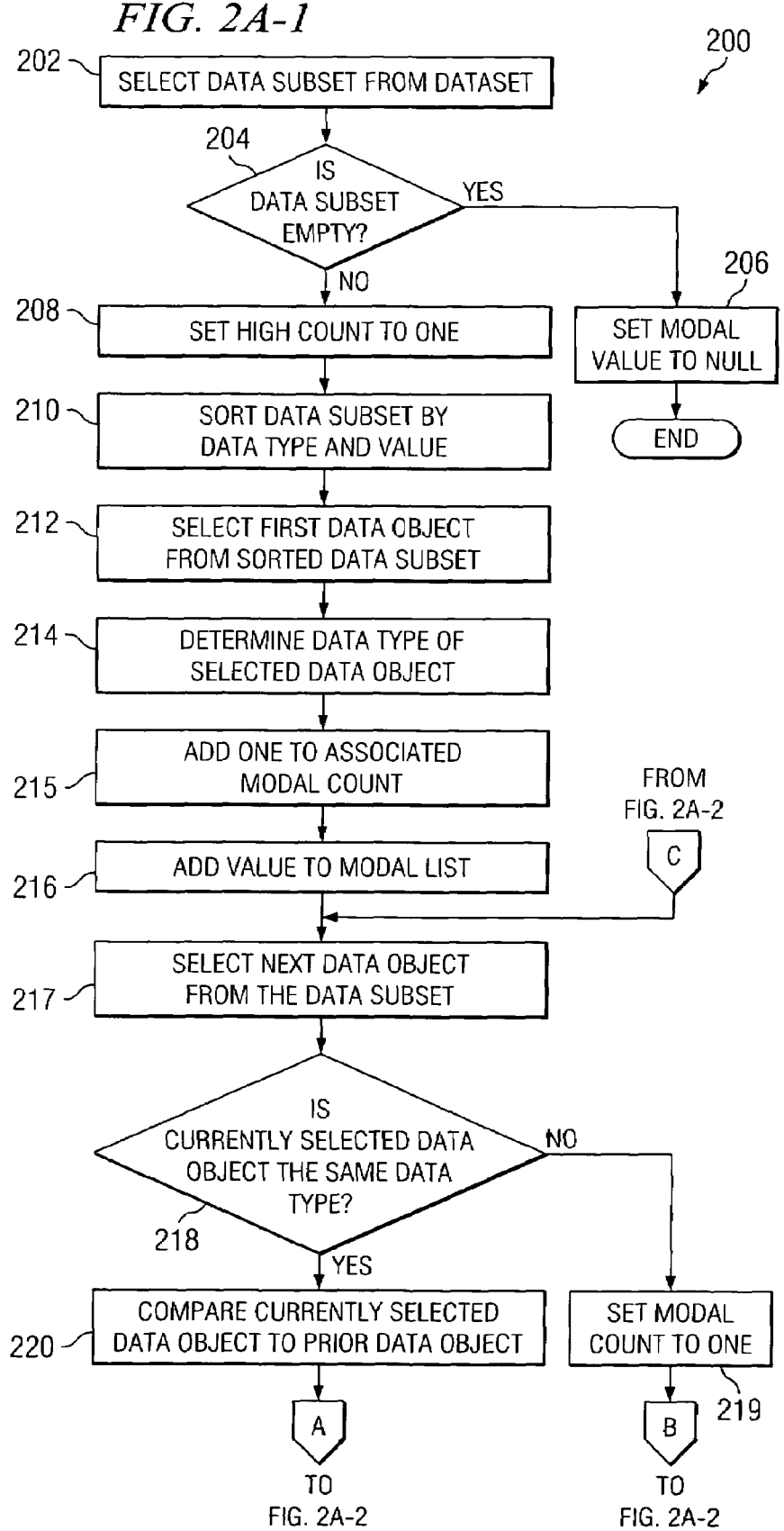

SYSTEM AND METHOD FOR AUTOMATICALLY DETERMINING MODAL VALUE OF NON-NUMERIC DATA

TECHNICAL FIELD

This disclosure relates generally to the field of data processing and, more particularly, to a system and method for automatically determining modal value of non-numeric data.

BACKGROUND

Traditional automated statistical measures, such as average and median, typically operate on numeric values. But a mode, or modal function, is a statistical measure of central tendency that could be valid for qualitative data or text values that is currently performed manually. The modal function normally identifies one or more modal values that are repeated most frequently in a dataset. An employee may use the modal function to manually determine a mode from sets of non-numeric data, such as strings or dates. For example, a person may use the modal function to determine one or more surnames occurring most often in a report, a day of the week during which more orders were placed, and other non-numeric uses.

SUMMARY

This disclosure provides a system and method for automatically determining modal value of non-numeric data. In one embodiment, the method includes selecting a data subset of a dataset, the data subset comprising at least a portion of the dataset and including at least one non-numeric value. At least one modal value is determined based on the selected data subset.

In another embodiment, the method includes selecting a data subset of a dataset, the data subset comprising at least a portion of the dataset and including at least one non-numeric value and sorting the selected data subset by value. The sorted data subset is processed to identify one or more modal groups, each modal group comprising one or more instances of a substantially identical value. A modal count is then determined for each modal group, each modal count comprising the number of instances of the substantially identical value in the associated modal group. The highest one or more modal counts is determined and the substantially identical value from each modal group associated with the highest model count is selected. Each selected substantially identical value is assigned to one modal value.

In yet another embodiment, the method includes selecting a data subset of a dataset, the data subset comprising at least a portion of the dataset and including at least one non-numeric value and sorting the selected data subset by value. One data object is selected from the data subset. Next, a value of the data object is compared to a plurality of stored values in a lookup table, each stored value being associated with one modal count, and, in response to the value of the data object being located in the plurality of stored values, one is added to the associated modal count. The highest one or more modal counts is selected from the lookup table. Each stored value associated with one of the highest modal counts is assigned to one modal value.

DESCRIPTION OF EXAMPLE EMBODIMENTS

Figure 1:
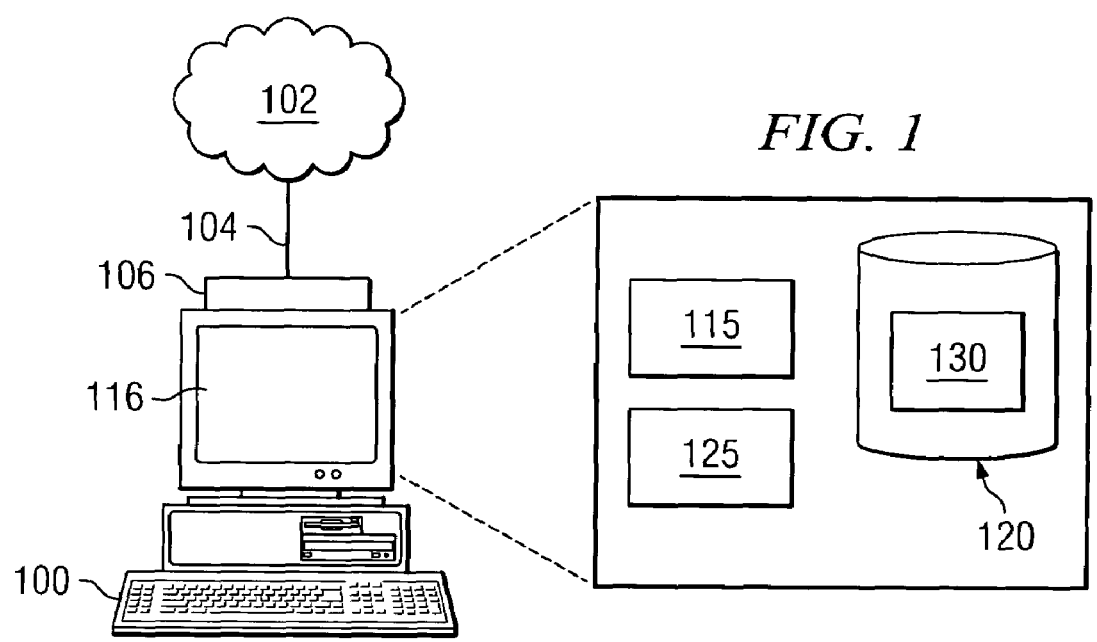
FIG. 1 illustrates an example system for automatically determining modal value of non-numeric data in accordance with one embodiment of the present disclosure.

FIG. 1 is a block diagram illustrating a computer system 100 for automatically determining at least one modal value of non-numeric data according to one embodiment of the present disclosure. The determination of at least one modal value normally identifies one or more values that are repeated most frequently in a dataset. In general, the present disclosure contemplates any system 100 that automatically processes a dataset to determine one or more modal values. Accordingly, computer 100 may comprise a portion of an object-oriented, repository-based information management system operable to retrieve a plurality of data objects from a dataset 130, determine one or more modal values based on the retrieved data, and communicate the modal values to one or more users. For example, system 100 may include a modal engine 115 that retrieves a portion of data stored in a database and returns the determined one or more modal values. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined at least partially at run-time based on one or more variables such as, for example, the size of the retrieved data subset or a data type of each data object. As used herein, the term each means every one of at least a subset of the data objects.

Computer system 100 includes graphical user interface 116, memory 120, processor 125, and an input device such as a keyboard, mouse or touch screen. The illustrated system 100 also includes modal engine 115 and dataset 130 that may be stored in memory 120 and executed or processed by processor 125. At a high level, as used in this document the term "computer" is intended to encompass a personal computer, workstation, server network computer, mainframe or any other suitable processing device. Moreover, "computer system 100" and "user of computer system 100" may be used interchangeably, as appropriate, without departing from the scope of this disclosure. Computer system 100 may execute any operating system including UNIX, Windows, Linux, and others. FIG. 1 only provides one example of a computer that may be used with the disclosure. The present disclosure contemplates computers other than general purpose computers as well as computers without conventional operating systems.

Graphical user interface (GUI) 116 comprises, at least, a graphical user interface operable to allow the user of computer 100 to interact with one or more processes executing on computer 100. Generally, GUI 116 provides the user of computer 100 with an efficient and user-friendly presentation of data provided by computer 100 or network 102. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 102 can accept data from the user of computer 100 via the web browser (e.g., Microsoft Internet Explorer or Netscape Navigator) and return the appropriate HTML, Java, or eXtensible Markup Language (XML) responses.

Computer 100 may include an interface 106 for communicating with other computer systems over network 102 such as, for example, in a client-server or other distributed environment via link 104. Network 102 facilitates wireless or wireline communication between computer system 100 and any other computer. Network 102 may communicate, for example, Internet Protocol (IP) packets, Frame Relay frames, Asynchronous Transfer Mode (ATM) cells, voice, video, data, and other suitable information between network addresses. Network 102 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 106 comprises logic encoded in software and/or hardware in a suitable combination and operable to communicate with network 102 via link 104. More specifically, interface 106 may comprise software supporting one or more communications protocols associated with link 104 and communications network 102 hardware operable to communicate physical signals.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. Illustrated memory 120 stores, or includes references to, dataset 130. Generally, dataset 130 includes a plurality of data objects of any appropriate data type, including float, integer, currency, date, decimal, string, or any other numeric or non-numeric format. Each data object is operable to store at least one logical value in the appropriate data type. For example, dataset 130 may comprise a relational database described in terms of SQL statements or scripts. Relational databases often use sets of schemas to describe the tables, columns, and relationships in the tables using basic principles known in the field of database design. In another embodiment, dataset 130 may comprise XML documents, flat files, Btrieve files, or comma-separated-value (CSV) files. Memory 120 may include any other suitable data or module without departing from the scope of this disclosure.

Processor 125 executes instructions and manipulates data to perform the operations of computer 100 and related modules, such as processing by modal engine 115. Although FIG. 1 illustrates a single processor 125 in computer 100, multiple processors 125 may be used and reference to processor 125 is meant to include multiple processors 125 where applicable. Modal engine 115 could include any hardware, software, firmware, logic, or combination thereof operable to access dataset 130, process one or more data objects in dataset 130, and determine at least one modal value based on the data objects within the scope of this disclosure. For example, modal engine 115 may be written or described in any appropriate computer language including C, C++, Java, Visual Basic, any suitable version of 4GL, and others. Further, it will be understood that while modal engine 115 is illustrated as a single multi-tasked module, the features and functionality performed by this module may be performed by multiple modules such as, for example, a data retrieval module and a statistical module. Moreover, while not illustrated, modal engine 115 may be a child or sub-module of another module without departing from the scope of this disclosure.

In one aspect of operation, modal engine 115 retrieves a plurality of data objects, collectively a data subset, from dataset 130. Modal engine 115 may use any appropriate technique to select, receive, collect, or retrieve the data subset including SQL queries, utilizing a TCP/IP packet analyzer, manual selection by a user, and others. The data subset includes at least one non-numeric data object, but may also include any number of other objects of any data type, including numeric, as illustrated by the table below.

| Data subset | Modal Value |
| --- | --- |
| {1, 2, 3, "John"} | None |
| {1, 1, "John"} | 1 |
| {1, 1, 2, "John"} | 1 |
| {1, 1, 2, 10, "John"} | 1 |
| {1, 1, 2, 2, "John"} | 1, 2 |
| {1, 1, 2, 2, 3, "John", "John"} | 1, 2, "John" |
| {"1-jan-2003","1-jan-2003","2-jan-2003"} | "1-jan-2003" |
| {"John", "John", "Mary"} | "John" |

It will be understood that the prior table and accompanying description are for illustration purposes only and may not depict actual input data used or output modal values from techniques for determining at least one modal value for non-numeric data. Once the data subset is at least partially available for processing, modal engine 115 sorts the subset by data type and value. Modal engine 115 processes the sorted subset by dynamically counting identical data objects. Once a change in value is located in the subset, the current modal count is automatically compared to the highest modal count determined thus far. If the current modal count is greater than or equal to the current high count, then modal engine 115 has located at least one modal value for the processed portion of the data subset and adds the value to a modal list. Once the entire data subset is processed, the list of modal values may be communicated to the user of computer system 100 via GUI 116 or to another computer via network 102.

In another aspect of operation, modal engine 115 receives a data subset from, for example, memory 120 or network 102. The received data subset may include no data objects, a plurality of data objects of one data type, or a combination of different data types. In response to the received data subset being empty, modal engine 115 may set one modal value to NULL. In response to the received data subset comprising data objects of one data type, modal engine 115 first sorts the subset by each object's value. Modal engine 115 processes the sorted subset by dynamically counting identical data objects. Once a change in value is located in the subset, the current modal count is automatically compared to the highest modal count determined thus far. If the current modal count is greater than or equal to the current high count, then modal engine 115 has located at least one modal value for the processed portion of the data subset and adds the value to a modal list. Once the entire data subset is processed, the list of modal values and associated modal counts may be communicated to the user of computer system 100 via GUI 116 or to another computer via network 102. In this aspect of operation, if the data subset comprises data objects of different data types, modal engine 115 may first separate the data subset into a plurality of data groups based on data type. Modal engine 115 then processes each data group of one data type individually as described immediately above. It will be understood that this individual data type processing may be executed concurrently.

Figures 2, 2A:
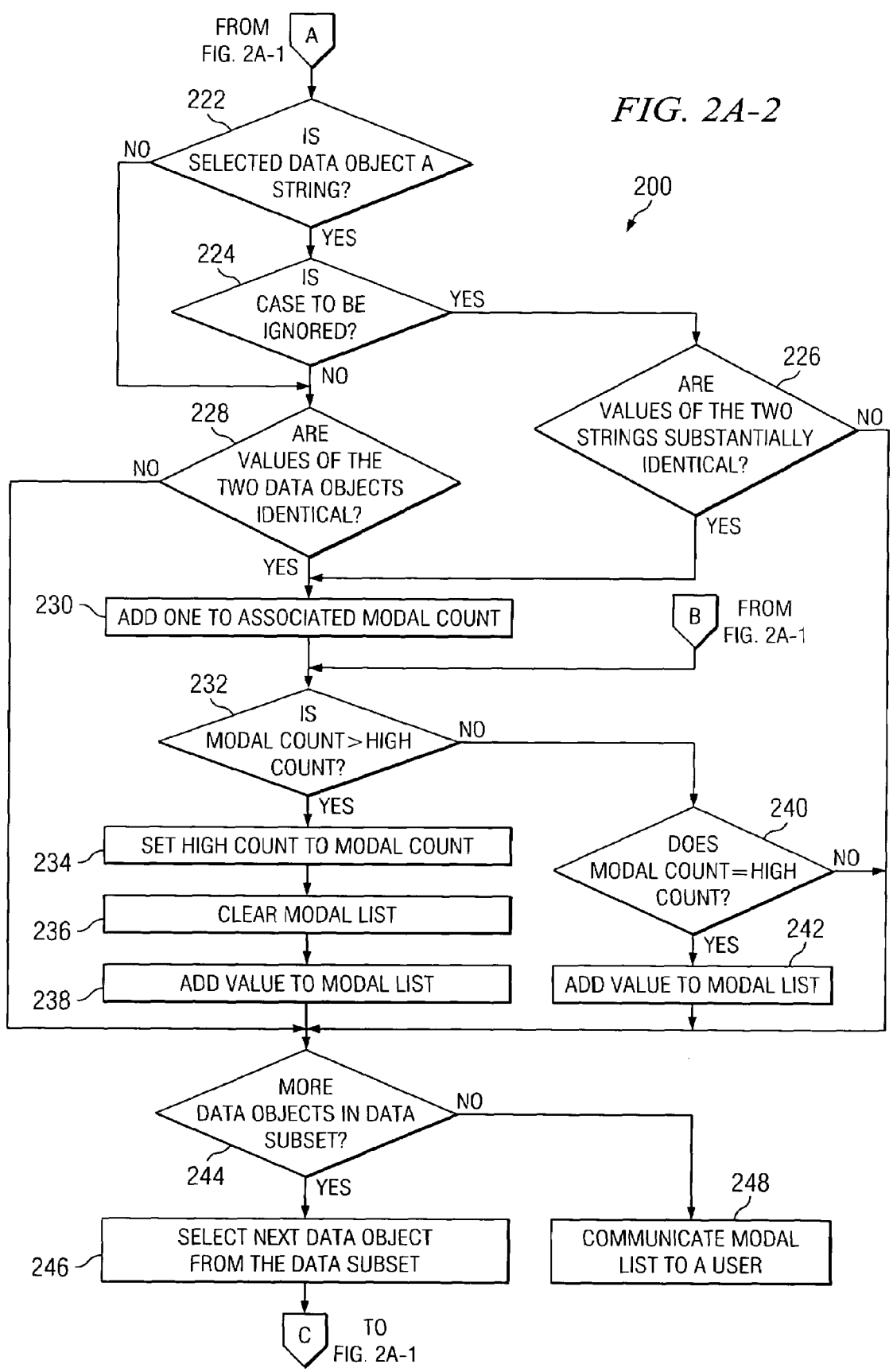
FIGS. 2A–B are flowcharts illustrating example methods for automatically determining modal value of non-numeric data in accordance with one embodiment of the present disclosure.
Figure 2B:
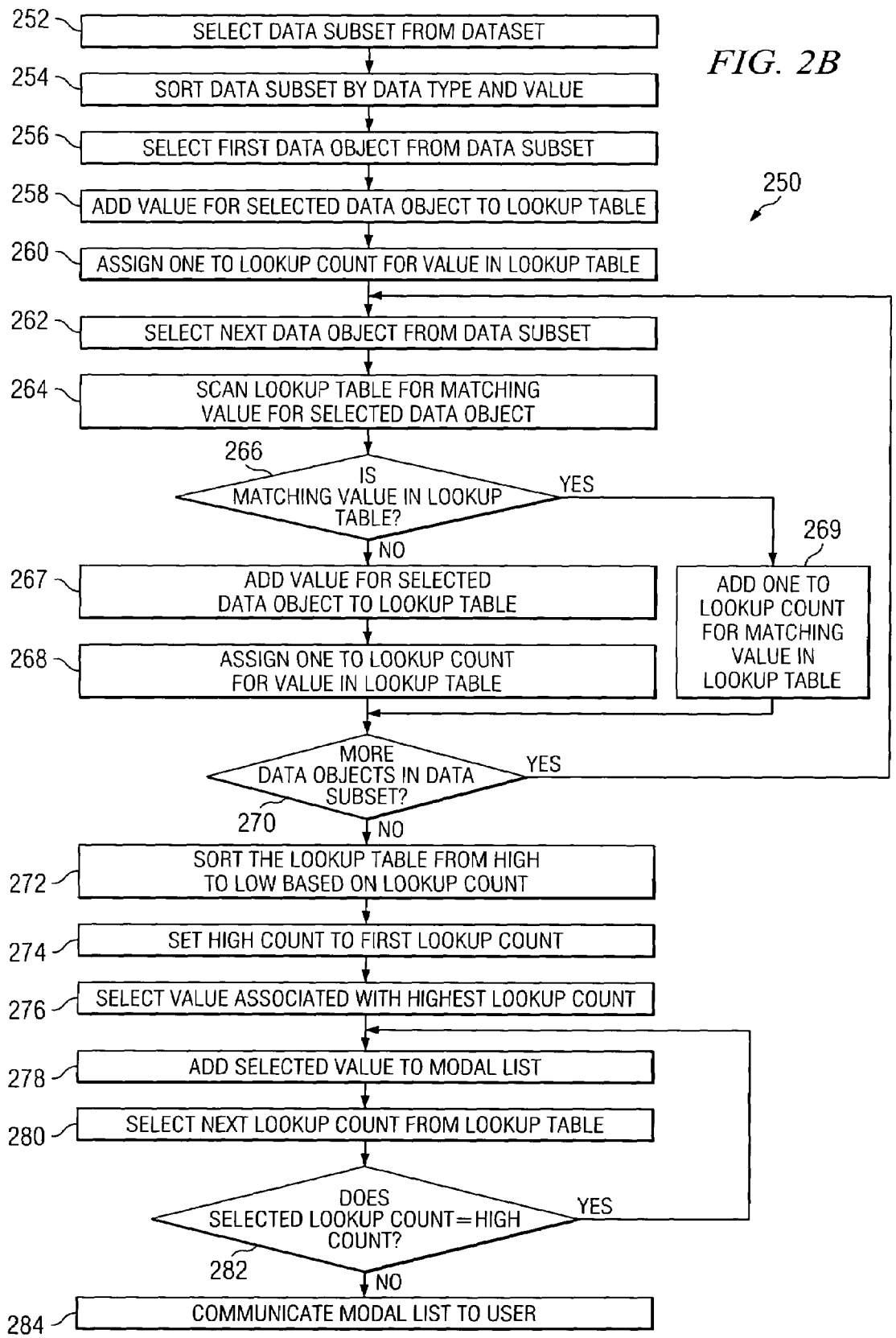

FIGS. 2A–B are flowcharts illustrating example methods 200 and 250, respectively, for automatically determining at least one modal value of non-numeric data in accordance with one embodiment of the present disclosure. Generally, FIGS. 2A1–2 describe method 200, which attempts to receive or retrieve a data subset, including non-numeric values, from dataset 130, sorts the data subset by data type, and determines at least one modal value based on the data subset by dynamically maintaining a current high count of possible modal values. The following descriptions will focus on the operation of modal engine 115 in performing method 200. This description further includes temporary or run-time data structures such as modal count and high count for dynamically computing the current number of modal values and the highest modal count yet found, respectively. But system 100 contemplates using any appropriate combination and arrangement of logical elements implementing some or all of the described functionality.

Example method 200 begins at step 202 when computer system 100 selects a data subset from dataset 130. As described above, this selection may be in response to a user command, receiving the data subset via network 102, or dynamic retrieval of the data subset from a database. At decisional step 204, modal engine 115 determines if the selected data subset is empty. For example, a user query may retrieve zero data objects. If the data subset is empty, then modal engine 115 sets the modal value to NULL at step 206. Otherwise execution proceeds to step 208. At step 208, modal engine 115 initializes a high count variable to one. Part of this initialization may include modal engine 115 clearing any old values from a modal list. The modal list may comprise any data structure operable to dynamically store the temporary modal values such as, for example, an array of modal data objects or pointers thereto. In certain embodiments, once processing of the data subset is complete, the modal list includes the final modal values and is communicated to a user through GUI 116. Once the data subset has been selected and the run-time data structures have been initialized, modal engine 115 begins processing the dataset at step 210.

At step 210, modal engine 115 sorts the selected data subset according to the data type and value associated with each data object. Next, modal engine 115 selects a first data object from the sorted data subset at step 212. Modal engine 115 then determines the data type associated with the selected first data object at step 214. At step 215, modal engine 115 creates a first modal count associated with the value from first data object at step 215. Step 215 often includes setting the high count to the same value as the new modal count, in this case one. Then, at step 216, modal engine 115 adds the data object value to the dynamic modal list. In another embodiment, modal engine may add a reference to the value to the modal list such as, for example, an index or a pointer. Modal engine 115 then begins processing the remainder of the selected dataset in steps 217 through 246.

Modal engine 115 selects the next data object from the sorted data subset at step 217. Next, at decisional step 218, modal engine 115 determines if the currently selected data object is of the same data type as the prior data object. If the data types substantially differ, then modal engine 115 sets the modal count to one and proceeds to step 232. If the data objects are substantially the same data type, modal engine 115 compares the currently selected data object with the prior data object at step 220. At decisional step 222, modal engine 115 determines if the selected data object has an associated data type of string. If the selected data object is a string, then execution proceeds to decisional step 224, where modal engine determines if the case is to be ignored. For example, modal engine 115 may retrieve the value of a determinative boolean, binary, or integer variable such as, for example, ignorecase. If modal engine 115 determines that the case can be ignored between the two strings, then modal engine 115 determines if the value of the two strings are substantially identical at decisional step 226. For example, modal engine 115 may process the two string objects as if they were both in lower-case format. If the value of the two string objects are substantially identical, then execution proceeds to step 230. Otherwise execution proceeds to step 244. Returning to decisional steps 222 and 224, if modal engine 115 determines that the selected data object is not a string or if the case should not be ignored, then execution proceeds to step 228. At decisional step 228, modal engine 115 determines if each value associated with the two data objects are identical. If the values are not identical, then execution proceeds to step 244. However, if modal engine 115 determines that the values are identical, or substantially identical in the case of string data objects, then processing proceeds to step 230. Once at least substantially identical values have been located, modal engine 115 adds one to the temporary modal count at step 230. Next, at decisional step 232, modal engine 115 determines if the modal count is greater than the temporary high count. If the modal count is not greater than the high count, then processing proceeds to decisional step 240. Otherwise, if the modal count is greater than the high count, then modal engine 115 sets the high count to the current modal count at step 234. Next, modal engine 115 clears the modal list at step 236 and adds the current value to the now empty modal list at step 238. As above, in another embodiment, modal engine may add a reference to the value to the modal list such as, for example, an index or a pointer. In this case, modal engine 115 has located a modal value that occurs more often than any other previously processed value, if any. Processing then proceeds to step 244.

Returning to decisional step 232, if modal engine 115 determines that the modal count was less than or equal to the high count, then modal engine 115 next determines if the modal count is equal to the high count at decisional step 240. If the modal count is equal to the high count, then modal engine 115 adds the value associated with the current data type to the modal list at step 242. In another embodiment, modal engine may add a reference to the value to the modal list such as, for example, an index or a pointer. In this case, modal engine 115 has determined that at least two values appear in the data subset an equal number of times, but more than other processed values, if any. Accordingly, the modal list includes both modal values. Next, or if the modal count was less than the high count, then modal engine 115 determines if there are more data objects in the data subset at decisional step 244. If there are more data objects in the data subset, the modal engine selects the next data object from the data subset at step 246 and execution returns to step 217. Once all the data objects in the data subset have been processed, computer system 100 communicates the modal list, including all the associated modal values, to the user at step 248.

FIG. 2B is a flowchart illustrating another example method 250 for automatically determining at least one modal value of non-numeric data. At a high level, method 250 involves modal engine 115 receiving or retrieving a data subset, including non-numeric values, from dataset 130, dynamically populating a lookup table comprising processed values from the data subset, and determining at least one modal value based on the lookup table. As in FIGS. 2A1–2, the following description will focus on the operation of modal engine 115 in performing method 250. But system 100 contemplates using any appropriate combination and arrangement of logical elements, implementing some or all of the described functionality.

Example method 250 begins at step 252 when computer system 100 selects a data subset from dataset 130. As described above, this selection may be in response to a user command, receiving the data subset via network 102, or dynamic retrieval of the data subset from a database. At step 254, modal engine 115 sorts the selected dataset according to the data type and value associated with each data object. Next, modal engine 115 selects a first data object from the sorted data subset at step 256. Modal engine 115 adds the value associated with the first data object to a lookup table at step 258. In one embodiment, the lookup table comprises a data structure operable to store each unique value associated with each data object from the data subset. Often, the lookup table includes a count variable associated with each lookup value. At step 260, modal engine 115 assigns one to the lookup count associated with the value for the first data object in the lookup table. Execution then proceeds to step 262 through 270, where modal engine 115 processes the remainder of the data subset.

At step 262, modal engine 115 selects the next data object from the data subset. Modal engine 115 then scans the lookup table to determine if there is a lookup value that matches the value of the currently selected data object at step 264. Next, at decisional step 266, if modal engine 115 determines that there is a matching lookup value in the lookup table, the modal engine 115 adds one to the lookup count for the matching lookup value in the lookup table at step 269. Otherwise, if there is no matching lookup value, then modal engine 115 adds the value associated with the selected data object to the lookup table at step 267. Next, at step 268, modal engine 115 assigns one to the lookup count for the lookup value in the lookup table. Next, at decisional step 270, modal engine 115 determines if there are more unprocessed data objects in the data subset. If there are more data objects, then execution returns to step 262. Otherwise, modal engine 115 has processed substantially all of the data subset and determines the one or more modal values based on the populated lookup table in steps 272 through 284.

Modal engine 115 sorts the lookup table in descending order based on the lookup count at step 272. Next, at step 274, modal engine 115 sets the value of a high count variable to the value of the highest lookup count. Modal engine 115 then selects the value associated with the highest lookup count at step 276. At step 278, modal engine 115 adds the selected lookup value to a modal list. Modal engine 115 then selects the next lookup count from the lookup table at step 280. If the next selected lookup count is equal to the high count at decisional step 282, then execution returns to step 278. Otherwise, the modal list now comprises all the modal values and, accordingly, modal engine 115 communicates the modal list to the user at step 284.

The preceding flowcharts and accompanying descriptions illustrate exemplary methods of operation for automatically determining at least one modal value of non-numeric data. However, these methods are merely illustrative, and system 100 contemplates modal engine 115 implementing any suitable techniques for suitably determining modal values of non-numeric data objects using some or all of the disclosed methods. Accordingly, any or all of these techniques may be used separately and/or together as appropriate to increase the efficiency of determining modal values in system 100. Moreover, because the flowcharts and descriptions are only illustrative, system 100 contemplates modal engine 115 using methods with additional steps, fewer steps, and/or different steps, in any order, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for automatically determining at least one modal value of non-numeric data, the method comprising:
   selecting a data subset from a dataset, the data subset comprising at least a portion of the dataset and including at least one non-numeric value;
   sorting the selected data subset by said at least one non-numeric value;
   processing the sorted data subset to identify one or more modal groups, each modal group including one or more instances of a substantially identical value;
   determining a modal count for each modal group, each modal count including a number of instances of the substantially identical value in the associated modal group;
   determining a highest one or more modal counts;
   determining at least one modal value based, at least in part, on the one or more modal groups, wherein said determining at least one modal value includes:
   selecting the substantially identical value from each modal group associated with the highest modal count, and
   assigning each selected substantially identical value to a modal value; and outputting the at least one modal value.

2. The method of claim 1, wherein selecting the data subset from the dataset comprises querying a database.

3. The method of claim 1, each value of the data subset comprising one of the following data types:
   float;
   integer;
   currency;
   date;
   decimal; or
   string.

4. The method of claim 1, further comprising assigning a null value to one modal value in response to each modal count being equal to one.

5. The method of claim 1, one of the modal groups comprising at least one lowercase string value and at least one mixed-case string value.

6. The method of claim 1, wherein determining at least one modal value based on the selected data subset comprises:

selecting one data object from the data subset;
comparing a value of the data object to a plurality of stored values in a lookup table, each stored value being associated with one modal count;
adding one to the associated modal count in response to the value of the data object being located in the plurality of stored values;
selecting a highest one or more modal counts from the lookup table; and
assigning each stored value associated with one of the highest modal counts to one modal value.

7. A method for automatically determining at least one modal value of non-numeric data, the method comprising:
selecting a data subset from a dataset, the data subset comprising at least a portion of the dataset and including at least one non-numeric value;
sorting the selected data subset by value;
processing the sorted data subset to identify one or more modal groups, each modal group comprising one or more instances of a substantially similar value;
determining a modal count for each modal group, each modal count comprising a number of instances of the substantially similar value in the associated modal group;
determining a highest one or more modal counts;
determining at least one modal value based, at least in part, on the one or more modal groups, wherein
the substantially similar value from each modal group associated with the highest modal count is selected; and
each selected substantially similar value is assigned to a modal value;
and outputting the at least one modal value.

8. A computer readable medium containing computer-executable instructions for automatically determining at least one modal value of non-numeric data, the computer-executable instructions operable when executed to:
select a data subset from a dataset, the data subset comprising at least a portion of the dataset and including at least one non-numeric value;
sort the selected data subset by said at least one non-numeric value;
process the sorted data subset to identify one or more modal groups, wherein each modal group comprises one or more instances of a substantially identical value;
determine a modal count for each modal group, wherein each modal count comprises a number of instances of the substantially identical value in the associated modal group;
determine a highest one or more modal counts;
determine at least one modal value based, at least in part, on the one or more modal groups, wherein said instruction operable to determine at least one modal value further includes computer-executable instructions operable to:
select the substantially identical value from each modal group associated with the highest modal count, and
assign each selected substantially identical value to a modal value; and
output the at least one modal value.

9. The computer readable medium of claim 8, wherein selecting the data subset from the dataset comprises querying a database.

10. The computer readable medium of claim 8, each value of the data subset comprising one of the following data types:
float;
integer;
currency;
date;
decimal; or
string.

11. The computer readable medium of claim 8, the computer-executable instructions further operable when executed to assign a null value to one modal value in response to each modal count being equal to one.

12. The computer readable medium of claim 8, one of the modal groups comprising at least one lowercase string value and at least one mixed-case string value.

13. The computer readable medium of claim 8, wherein the computer-executable instructions are further operable when executed to determine at least one modal value based on the selected data subset by:
selecting one data object from the data subset;
comparing a value of the data object to a plurality of stored values in a lookup table, each stored value being associated with one modal count;
adding one to the associated modal count in response to the value of the data object being located in the plurality of stored values;
selecting a highest one or more modal counts from the lookup table; and
assigning each stored value associated with one of the highest modal counts to one modal value.

14. A system for automatically determining at least one modal value of non-numeric data, the system comprising:
a memory operable to store a data set, the data set comprising a plurality of data objects and each data object comprising a data type and a value; and
one or more processors operable to:
select a data subset from the dataset, the data subset comprising at least a portion of the plurality of data objects and including at least one non-numeric value;
sort the selected data subset by said at least one non-numeric value;
process the sorted data subset to identify one or more modal groups,
wherein each modal group comprises one or more instances of a substantially identical value;
determine at least one modal value based, at least in part, on the one or more modal groups, wherein said processors operable to determine at least one modal value further include computer-executable instructions operable to:
determine a modal count for each modal group, wherein each modal count comprises a number of instances of the substantially identical value in the associated modal group,
determine a highest one or more modal counts,
select the substantially identical value from each modal group associated with the highest modal count, and
assign each selected substantially identical value to one modal value; and
output the at least one modal value.

15. The system of claim 14, wherein the processors are operable to select the data subset from the dataset by querying a database.

16. The system of claim 14, each data object comprising one of the following data types:
float;
integer;
currency;

date;
decimal; or
string.

17. The system of claim 14, the processors further operable to assign a null value to one modal value in response to each modal count being equal to one.

18. The system of claim 14, one of the modal groups comprising at least one lowercase string value and at least one mixed-case string value.

19. The system of claim 14, wherein the processors are operable to determine at least one modal value based on the selected data subset by:

selecting one data object from the data subset;
comparing a value of the data object to a plurality of stored values in a lookup table, each stored value being associated with one modal count;
adding one to the associated modal count in response to the value of the data object being located in the plurality of stored values;
selecting a highest one or more modal counts from the lookup table; and
assigning each stored value associated with one of the highest modal counts to one modal value.

* * * * *